(12) United States Patent
Chainani et al.

(10) Patent No.: US 9,953,025 B2
(45) Date of Patent: *Apr. 24, 2018

(54) QUERY PROCESSING USING A DIMENSION TABLE IMPLEMENTED AS DECOMPRESSION DICTIONARIES

(71) Applicant: International Business Machines Corporation, Armonk, NY (US)

(72) Inventors: Naresh K. Chainani, Portland, OR (US); Garth A. Dickie, Framingham, MA (US); Ian R. Finlay, Uxbridge (CA); Robin D. Grosman, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,577

(22) Filed: Apr. 26, 2016

(65) Prior Publication Data
US 2016/0378783 A1 Dec. 29, 2016

Related U.S. Application Data

(63) Continuation of application No. 14/753,752, filed on Jun. 29, 2015.

(51) Int. Cl.
*G06F 17/30* (2006.01)
*G06F 17/27* (2006.01)

(52) U.S. Cl.
CPC .... *G06F 17/2735* (2013.01); *G06F 17/30321* (2013.01); *G06F 17/30498* (2013.01)

(58) Field of Classification Search
CPC .......... G06F 17/2735; G06F 17/30321; G06F 17/30498
USPC ........................................................ 707/741
See application file for complete search history.

(56) References Cited

U.S. PATENT DOCUMENTS

| 5,864,856 | A | * | 1/1999 | Young | G06F 17/30595 |
| | | | | | 707/740 |
| 6,105,026 | A | * | 8/2000 | Kruglikov | G06F 17/30312 |
| 6,205,447 | B1 | * | 3/2001 | Malloy | G06F 17/30592 |

(Continued)

OTHER PUBLICATIONS

List of IBM Patents or Patent Applications Treated As Related, Apr. 26, 2016.

*Primary Examiner* — Kris E Mackes
*Assistant Examiner* — Thuy T Bui
(74) *Attorney, Agent, or Firm* — Erik K. Johnson; Edell, Shapiro & Finnan, LLC

(57) ABSTRACT

According to one embodiment of the present invention, a system may execute database queries and may comprise a computer system including at least one processor. The system may select a column of a first table as a candidate column for creating a dictionary, create tokens for a foreign key in a second table that corresponds to a primary key in the first table, generate the dictionary for the selected column using the created tokens as indexes in the dictionary and modify a query accessing the column of the first table to retrieve column values based on the dictionary. Embodiments of the present invention further include a method and computer program product executing database queries in substantially the same manner described above.

7 Claims, 4 Drawing Sheets

(56) References Cited

U.S. PATENT DOCUMENTS

| | | | | |
|---|---|---|---|---|
| 6,212,524 | B1 * | 4/2001 | Weissman | G06F 17/30592 |
| | | | | 707/600 |
| 6,484,179 | B1 * | 11/2002 | Roccaforte | G06F 17/30592 |
| | | | | 707/737 |
| 6,636,870 | B2 | 10/2003 | Roccaforte | |
| 7,080,081 | B2 * | 7/2006 | Agarwal | G06F 17/30592 |
| | | | | 707/600 |
| 7,480,662 | B2 | 1/2009 | Potapov et al. | |
| 8,396,860 | B1 | 3/2013 | Ramesh et al. | |
| 2006/0238390 | A1 * | 10/2006 | Yi | H04N 19/94 |
| | | | | 341/87 |
| 2007/0052559 | A1 * | 3/2007 | Ohk | H04N 1/4115 |
| | | | | 341/50 |
| 2009/0006399 | A1 * | 1/2009 | Raman | G06F 17/30498 |
| 2009/0274294 | A1 * | 11/2009 | Itani | H03M 7/30 |
| | | | | 380/28 |
| 2011/0173164 | A1 * | 7/2011 | Bendel | G06F 17/30501 |
| | | | | 707/693 |
| 2013/0060780 | A1 * | 3/2013 | Lahiri | H03M 7/3088 |
| | | | | 707/741 |
| 2013/0148745 | A1 * | 6/2013 | Agarwal | H03M 7/30 |
| | | | | 375/241 |
| 2013/0238865 | A1 * | 9/2013 | Kataoka | G06F 12/00 |
| | | | | 711/154 |
| 2014/0304275 | A1 * | 10/2014 | Baskett | G06F 17/30315 |
| | | | | 707/747 |

* cited by examiner

QUERY PROCESSING USING A DIMENSION TABLE IMPLEMENTED AS DECOMPRESSION DICTIONARIES

CROSS-REFERENCE TO RELATED APPLICATIONS

This application is a continuation of U.S. patent application Ser. No. 14,753,752, entitled "Query Processing Using a Dimension Table Implemented as Decompression Dictionaries" and filed Jun. 29, 2015, the disclosure of which is incorporated herein by reference in its entirety.

BACKGROUND

1. Technical Field

Present invention embodiments relate to query processing data processing systems, and more specifically, to execution of queries using a dimension table implemented as decompression dictionaries to reduce or eliminate join operations.

2. Discussion of the Related Art

Data is often organized into tables that are divided into rows and columns. In a denormalized database schema, fact tables may contain columns of data that represent quantities of interest while dimension tables may contain values that provide categories of data. For example, if a fact table such as a "sales" table contains separate sales figures for each month and for each product, then details of months and products may be stored in "month" and "product" dimension tables.

Small dimension tables are fairly common in a denormalized database schema. These small dimension tables require a join operation to be carried out in order to take advantage of dimension filtering against a fact table. Solutions such as semi-joins, Materialized Query Tables (MQTs), and materialization of one or more dimension columns into the fact table (reversing the schema denormalization) are solutions that are either in use today or proposed solutions to provide higher performance for predicate filtering that occurs from local predicates applied to the dimension then joining the dimension to the fact table. Each of these increase disk space usage, or introduce various maintenance issues and/or overhead.

SUMMARY

According to one embodiment of the present invention, a system may execute database queries and may comprise a computer system including at least one processor. The system may select a column of a first table as a candidate column for creating a dictionary, create tokens for a foreign key in a second table that corresponds to a primary key in the first table, generate the dictionary for the selected column using the created tokens as indexes in the dictionary and modify a query accessing the column of the first table to retrieve column values based on the dictionary. Embodiments of the present invention further include a method and computer program product executing database queries in substantially the same manner described above.

BRIEF DESCRIPTION OF THE DRAWINGS

Generally, like reference numerals in the various figures are utilized to designate like components.

DETAILED DESCRIPTION

Embodiments according to the present invention may store small dimension tables in one or more compression dictionaries. In one embodiment, one dictionary may be generated for one dimension column. In another embodiment, one dictionary may be generated for multiple columns. Regardless of the dictionary being for a single column or multiple columns, in one embodiment, the compression symbol for the dictionary may be created using existing frequent value encoding techniques to represent the primary-foreign key relationship based on the frequency of the foreign key. In this case, a separate dictionary may be generated for the primary key column. Alternatively, in another embodiment, the primary key may be used as the compression symbol for a dictionary and index directly into the dictionary. Accordingly, embodiments in effect may materialize a dimension table into a fact table, with very little overhead for insert/update/delete operations and/or space increase for either the dimension table or the fact table, while providing direct predicate application from the dimension table against the fact table. In one embodiment, the dictionary may be implemented as a virtual materialization of the column, without metadata being created on the data in the dictionary. In another embodiment, the virtual materialization of the column may have metadata associated with the data in the dictionary (e.g., synopsis, statistics, zone maps and/or indexes).

Figure 1:
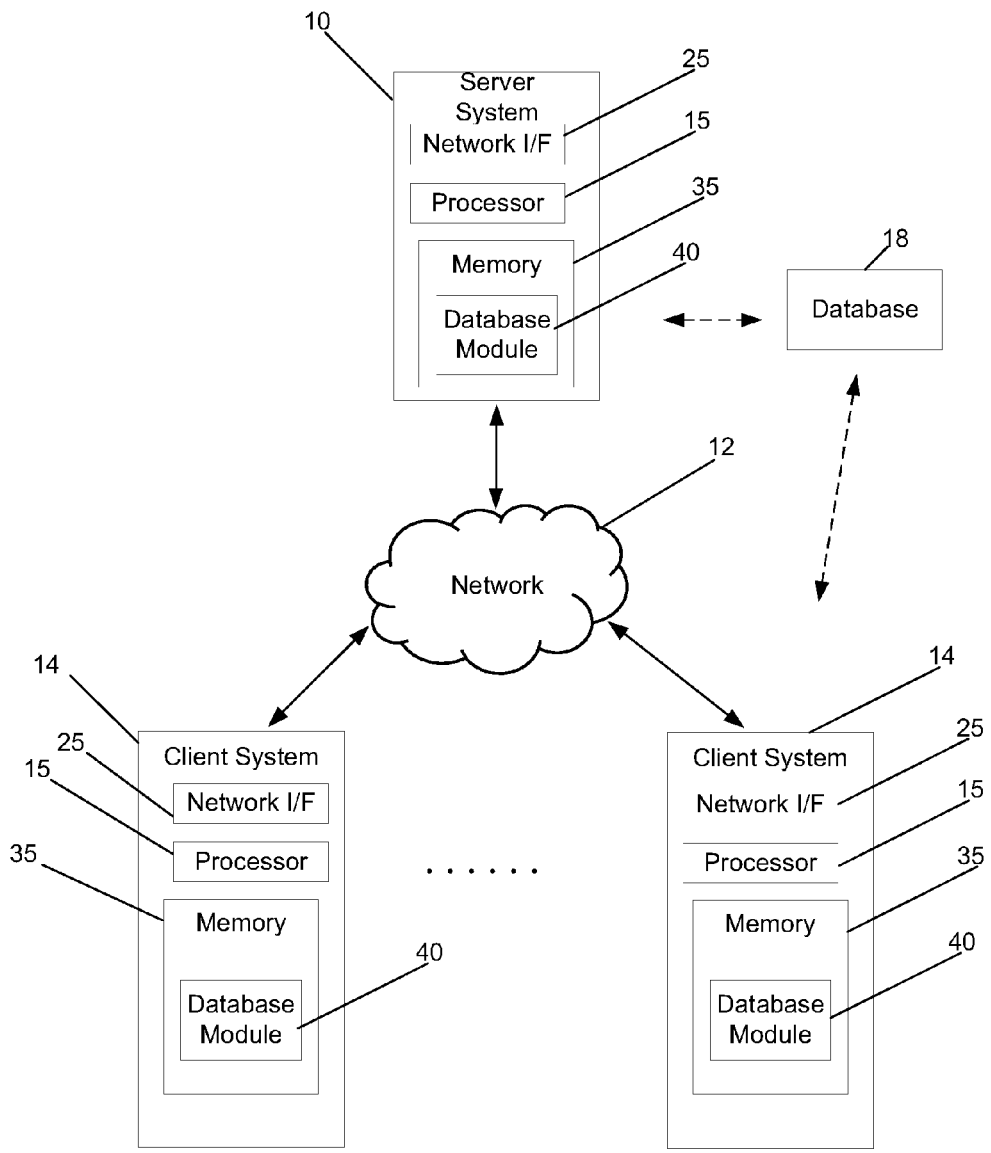
FIG. 1 is a diagrammatic illustration of an example computing environment for use with an embodiment of the present invention.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Server systems 10 and client systems 14 may implement a database system 18. The database system 18 may include data and logic that may be implemented as database modules 40 in the memory 35 of the server systems 10, client systems 14 or both. The database system 18 may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The server systems 10, the client systems 14, or both may present a graphical user (e.g., GUI, etc.) or other interface (e.g., command line prompts, menu screens, etc.) to solicit information from users pertaining to the database management and/or data analysis, and may provide reports including analysis results. In one embodiment, the database system 18 may reside completely on a server system 10 with only a user interface presented on a client system 14. In another embodiment, the database system 18 and its user interface may be hosted on one single machine, such as a server system 10 or a client system 14. In yet another embodiment, the system 18 may be distributed, with data, logic, or both distributed among server systems 10 and client systems 14.

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, module, browser/interface software, etc.).

In one or more embodiments, logic of the database systems 18 may be implemented in database modules, such as the database module 40 in memory 35 of the server systems 10 and/or the database module 40 in memory 35 of the client systems 14, to perform the various functions of present invention embodiments described herein. The database modules 40 may also include data operated upon by the logic. The various modules may be implemented by any combination of any quantity of software and/or hardware modules or units, and may reside within memory 35 of the server and/or client systems for execution by respective processor 15.

Figure 2:
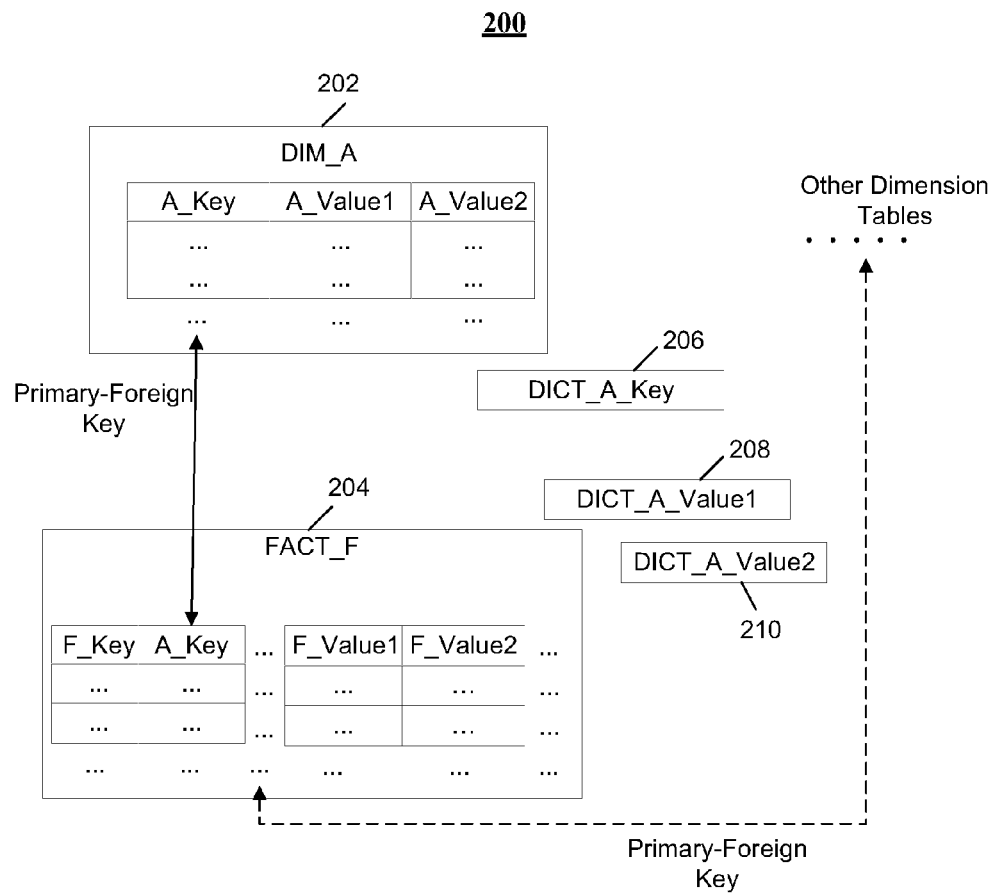
FIG. 2 is a diagrammatic illustration of an example schema having multiple dictionaries for a database system according to an embodiment of the present invention.

FIG. 2 shows an exemplary database schema 200 according to an embodiment of the present invention. The database system 18 may include multiple tables to store data. The exemplary database schema 200 may represent relationships among tables of the database system 18. The database schema 200 may comprise one or more dimension tables (represented by the dimension tables DIM_A 202), one or more fact tables (represented by the fact table FACT_F 204), and one or more dictionaries (represented by the dictionaries DICT_A_Key 206, DICT_A_Value1 208 and DICT_A_Value2 210). Each dimension table may comprise columns for a key and one or more features of the dimension. Each fact table may comprise columns for a key and one or more the features of the fact. The key for each fact or dimension table may be a primary key, which may be used to uniquely identify a record in the respective table. The primary key may be a number or an alphanumeric value, which may be generated automatically (e.g., automatic incrementing), randomly, manually, etc. As shown in FIG. 2, the table FACT_F 204 not only may have a key F_Key of the table FACT_F 204 but also may include the keys of other tables, such as A_Key of the DIM_A table 202. These keys of other tables may be referred to as foreign keys.

The primary-foreign key relationship is not limited to dimension table to fact table, such as from the dimension table DIM_A 202 to the fact table FACT_F 204 (which also may be referred to as a primary-foreign key relationship between the tables FACT_F 204 and DIM_A 202), but also may exist between dimension table and dimension table, and fact table and fact table in embodiments. For example, a dimension table may be a "nations" table that may include a plurality of records for nations and each nation may belong to one of a plurality of pre-defined regions, which may be defined in another dimension table for "regions." In this case, there may be a foreign key in the "nations" table that corresponds to a primary key in the "regions" table. In another example, a "lineitem" fact table may comprise a foreign key corresponding to a primary key in an "orders" fact table. In one embodiment, a table may comprise only one primary key (sometimes may be a composite key that contains two or more columns) but may have multiple foreign keys that correspond to primary keys in other tables.

A dictionary according to the present invention may be a compression dictionary used to effectively join column data of a first table (e.g., DIM_A 202) to a second table (e.g., FACT_F 204), thus avoiding the actual join operation(s). Each dictionary may translate a second table's foreign key (FK) to one column value. Column values corresponding to multiple foreign keys of a first table (e.g., DIM_A 202) may be retrieved through a dictionary and these retrieved values may further be treated as virtual columns of the second table (e.g., FACT_F 204), therefore enabling "denormalized" type query optimizations such as applying the combination of local predicates and join predicates (e.g., dimension predicates) directly to the second table as local predicates. Because the virtual column values are still looked up and not physically materialized, this approach may avoid some of the complications and overhead of true physical denormalization.

In one embodiment, there may be one dictionary per column for a dimension table. For example, FIG. 2 shows three dictionaries DICT_A_Key 206, DICT_A_Value1 208 and DICT_A_Value2 210 that correspond to the columns A_Key (which may be the primary key of the dimension table DIM_A 202), A_Value1 and A_Value2, respectively.

Figure 3:
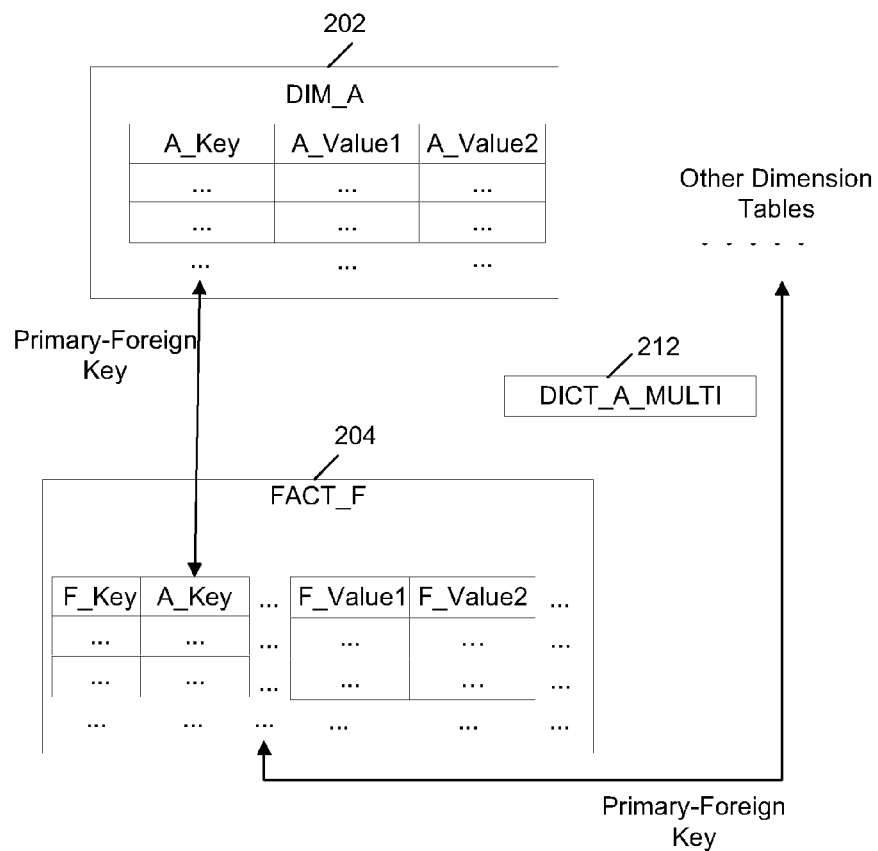
FIG. 3 is another diagrammatic illustration of an example schema having a multi-column dictionary for a database system according to an embodiment of the present invention.

In another embodiment, one dictionary may contain values from more than one column of a dimension table. For example, FIG. 3 shows one multi-column dictionary DICT_A_MULTI 212 which may include values from multiple columns of the dimension table DIM_A 202.

Figure 4:
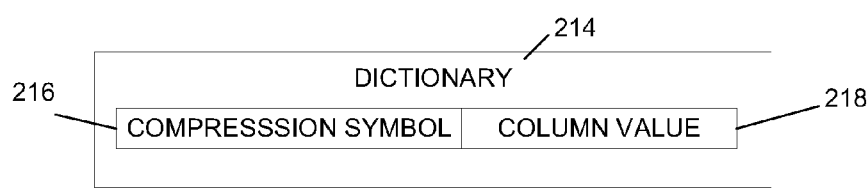
FIG. 4 is a diagrammatic illustration of a dictionary for a database system according to an embodiment of the present invention.

One exemplary structure of a dictionary 214 according to the present invention is shown in FIG. 4. Each entry of the dictionary 214 may include a compression symbol 216 and a corresponding column value 218. The compression symbol 216 may be an index in the dictionary 214 associated with the corresponding column value 218. Although the compression symbol 216 and its corresponding value 218 are shown side-by-side on FIG. 4, this is for illustration purpose only. In implementations according to the present invention, the compression symbol 216 and the corresponding value 218 may be stored in non-transitory storage, such as memory or hard drive, in any way suitable for storage and look up, not necessarily side-by-side. Moreover, in some embodiments, the value of the compression symbol 216 may be implied by positional offsets, multiplied offsets or other means that does not require materialization of the actual value associated with the compression symbol 216.

In some embodiments, the compression symbol 216 may be created by frequency based encoding according to the frequency of each foreign key in the fact table. Exemplary encoding techniques may include any compression techniques, such as but not limited to Huffman coding and arithmetic coding. For example, the dimension table DIM_A 202 may be a table for "nations" that include a plurality of nations including United States (A_Key: 25, A_Value1: United States, A_Value2: North America) and South Korea (A_Key: 18, A_Value1: South Korea, A_Value2: Asia). The fact table FACT_F 204 may be a table of "suppliers" and there are most suppliers based in South Korea and second most suppliers based in U.S., then there are more entries in the fact table FACT_F 204 with the A_Key being 18 than entries with the A_Key being 25. Assuming the compression symbol for the most frequent A_Key is hex number 1 (e.g., 0×1) and second most frequent A_Key is hex number 2 (e.g., 0×2), then the dictionaries DICT_A_Key 206 may have records (0×1, 18) and (0×2, 25), DICT_A_Value1 208 may have records (0×1, South Korea) and (0×2, United States) and DICT_A_Value2 210 may have records (0×1, Asia) and (0×2, North America).

It should be noted that the index and column values of each record in the dictionaries may depend on the values of entries in the fact table. For the same "nations" table DIM_A 202 as the example above, if the fact table FACT_F 204 is a table of "customers" and there are most customers based in United States and second most customers based in South Korea, then the there are more entries in the fact table FACT_F 204 with the A_Key being 25 than entries with the A_Key being 18. If the compression symbol for the most frequent A_Key is still hex number 1 (e.g., 0×1) and second most frequent A_Key is still hex number 2 (e.g., ×2), then the dictionaries DICT_A_Key 206 may have records (0×1, 25) and (0×2, 18), DICT _A_Value1 208 may have records (0×1, United States) and (0×2, South Korea) and DICT _A_Value2 210 may have records (0×1, North America) and (0×2, Asia).

In the case of a multi-column dictionary, the multi-column dictionary may comprise a compression symbol 216 and column value 218 just like the dictionary 214. The column value 218 in the multi-column dictionary may include the values of multiple columns of the underlying table concatenated together. For example, the DICT_A_MULTI 212 may have a column value concatenated by A_Key, A_Value1 and A_Value2 and any other values of DIM_A that need to be included in the dictionary. The concatenation may be implemented using fixed size fields, in-line length encoded fields, any delimiter, such as but not limited to, comma, semi-colon, space, tab, xml tags, special character, etc., or any other means suitable for storage of concatenated fields.

The multi-column dictionary may be used together with the dictionaries that correspond to single columns. For example, for the dimension table DIM_A 202 and fact table FACT_F 204, there may be a single column dictionary for A_Key and a two-column dictionary for A_Value1 and A_Value2. Using the DIM_A 202 being a "nations" table and FACT_F 204 being a "customers" table as described above as an example, the single column dictionary may have records (0×1, 25) and (0×1, 18), and the two-column dictionary may have records (0×1, United States# North America) and (0×2, South Korea# Asia) (assuming the special character "#" being the delimiter).

The compression symbol 216 does not need to be created by frequency based encoding in all embodiments. In at least some embodiments, the compression symbol 216 may be the primary-foreign key, such as A_Key in the DIM_A 202 and FACT_F 204 itself. Continue using the DIM_A 202 being a "nations" table and FACT_F 204 being a "customers" table as described above as an example, the single column dictionary to encode A_Key may be eliminated, and a two-column dictionary with records (25, United States# North America) and (18, South Korea# Asia) (assuming the special character "#" being the delimiter) may be used.

As described herein, the primary-foreign key relationship is not limited to dimension table to fact table, as such, the dictionaries may be created based on the primary-foreign key relationship as described herein for any primary-foreign key relationship. For example, the table DIM_A 202 may be a fact table, or the table FACT_F 204 may be a dimension table. In either case, the dictionaries 206, 208, 210, 212 and 214 as described herein are not affected.

In various embodiments, the compression dictionaries may in effect materialize a first table (e.g., DIM_A 202) into a second table (e.g., FACT_F 204), with very little overhead for insert, update, delete (I/U/D) activity and/or space increase for the underlying tables (e.g., the first or the second tables), while providing direct predicate application from the first table against the second table. This materialization may be either a virtual materialization without actually creating metadata associated with virtual columns or a materialization having metadata associated with any virtual columns. The metadata may include one or more of synopsis, statistics, zone maps, indexes, and other suitable tools for database analysis. As such, in embodiments according to the present invention, for execution of a query, if a first table is associated with a second table through primary-foreign key relationship and joined to the second table in the query, the first table may be replaced with a series of compression dictionaries and virtual columns in the target table(s) and the join to the first table may be eliminated or skipped in the query. The technique requires almost no additional storage in the second table, and provides for very rapid update abilities, on par with updates to the first table directly.

Figure 5:
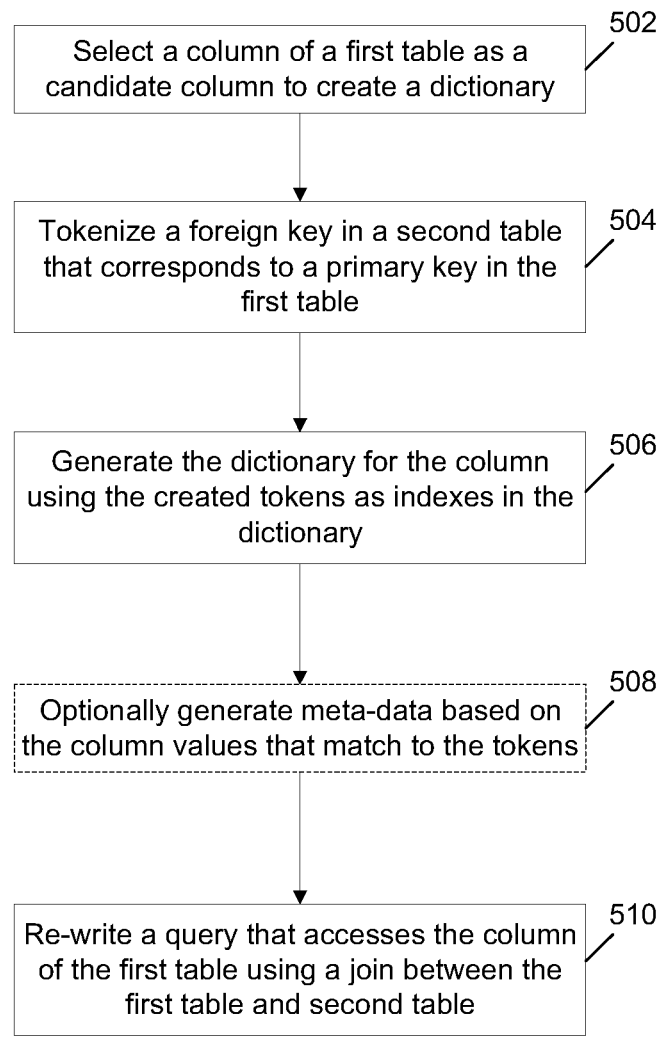
FIG. 5 is a procedural flow chart illustrating a manner in which a dictionary may be created and used according to an embodiment of the present invention.

An exemplary method 500 in which a dictionary is generated and used in a database system (e.g., database system 18) according to an embodiment of the present invention is illustrated in FIG. 5. The method 500 may start at block 502, in which a column of a first table may be selected as a candidate column to create a dictionary. In some embodiments, one or more candidate columns may be discovered through known analysis techniques, for example, by identifying the parent/child or dimension/fact table relations in the database schema and the most commonly accessed columns of the first table and the most common first/second table joins. The techniques used to identify the parent/child or dimension/fact table relations in the database schema may include schema specified primary-foreign key relationship, query analysis, metadata analysis, or any combination thereof. Using the first table being a dimension table as an example, the techniques used to identify the most commonly accessed dimension table columns and dimension/fact joins may include work load analysis, user input, or other known techniques.

At block 504, the method 500 may tokenize a foreign key in a second table that corresponds to a primary key in the first table. The foreign key in the second table and primary key in the first table may be, for example, the parent/child or dimension/fact table relation in the database schema identified in block 502. As described herein, the tokenization process may use any known or other dictionary tokenization techniques, such as but not limited to, Huffman coding, arithmetic coding, and static dictionaries.

At block 506, the method 500 may generate the dictionary for the column using the tokens created in block 504 as indexes into the dictionary. The created tokens may be the compression symbols as described herein. Also as described herein, the dictionary may be for one column of the first table (e.g., DICT_A_Key 206, DICT_A_Value1 208 and DICT_A_Value2 210), multiple columns of the first table (e.g., DICT_A_MULTI 212), or all columns of the first table (e.g., a special case of DICT_A_MULTI 212). In case of the dictionary being created for more than one column, the method 500 may identify multiple candidate columns in block 502. In one embodiment, the dictionary may be referred to as a decoding dictionary or a compression dictionary.

In some embodiments, for example, inequality predicate application and/or first table column ordering may be important. In this case, additional tokenized versions of the second table foreign key column may be added to allow token order and dictionary symbol order to be maintained in an ascending or descending, ordered fashion. Alternatively, in this case, a token may be chosen that exhibits ordering for multiple columns of the first table and this token may be used to create an alternate column in the second table that is then used to provide dictionary lookups for two or more columns. For example, a date column and a year column of a first table could share the same compression token, and be ordered properly relative to each other, if the token is ordered on date. In another example, a week of the year column and a quarter column of a first table could share the same compression token if the token is ordered by date (excluding the year component). In yet another embodiment, an intermediate mapping dictionary may also be created to allow token mapping between generated token column(s), to prevent the need for multiple dictionaries being generated for columns of first table when they do not have a specific ordering requirement.

At optional block 508, the method may generate metadata based on the virtual column(s). As described herein, the column values of the dictionaries may be treated as virtual columns of the second table. Moreover, metadata, such as one or more of synopsis, statistics, zone maps, indexes, etc., may be created based on the virtual column(s). At block 510, the method may re-write a query that accesses the column of the first table using a join between the first the table and the second table. For example, in a conventional database system, a query has to perform a join operation between the dimension table DIM_A 202 and fact table FACT_F 204 on the mapped foreign key A_Key in the fact table FACT_F 204 to the primary key A_Key of the dimension table DIM_A 202 to access the column A_Value1 to retrieve its value. But in an embodiment according to the present invention, such a join operation may be eliminated.

In one embodiment, multiple dictionaries may be created for one candidate column of the first table (e.g., multiple, differently ordered, tokenized columns for the subject dimension table). In this embodiment, the method 500 may select one underlying token ordered column for re-writing the query. The underlying token ordered column may be selected from among the token ordered columns that may provide access to the column value. The underlying token ordered column may be preliminarily selected, for example, based on either whether it is the most appropriate for use, or whether the underlying token ordering has multiple dictionaries associated with it. The preliminarily selected token ordered column may be passed to one or more optimization modules, such as but not limited to, a cost model optimizer and/or another determination or optimizing function, so the optimization modules can determine which one to select based on context, predicate application, and/or sorting/grouping/ordering requirement(s). In some embodiments, the preliminarily selected underlying token ordered column may be passed to the optimization module along with the options for equivalent columns.

In one embodiment, the re-write may be implemented in the database system 18 in a rewrite engine, which may be an extension to a query engine or a module separate from the query engine.

To illustrate the query re-write, in one example, the database system 18 may have a database that has the following tables: supplier, lineitem, orders, customer, nation. The "nation" table may include a primary key column (e.g., n_nationkey) and a nation name column (e.g., n_name). Both "supplier" and "customer" tables may have a respective foreign key (e.g., s_nationkey, c_nationkey) mapped to the primary key (e.g., n_nationkey) in the "nation" table. The "order" table may include a foreign key (e.g., o_custkey) mapped to a primary key (e.g. c_custkey) in the "customer" table. The "lineitem" table may include a foreign key (e.g., l_orderkey) mapped to a primary key (e.g., o_orderkey) in the "order" table, and another foreign key (e.g., l_suppkey) mapped to a primary key (e.g., s_suppkey) in the "supplier" table. A SQL query may be defined as follows, in which date( ) is a predefined function turning a string into a date data type:

```
select supp_nation, cust_nation, l_year, sum(volume) as revenue
from (select n1.n_name as supp_nation, n2.n_name as cust_nation, year(l_shipdate) as
l_year, l_extendedprice * (1 - l_discount) as volume
        from supplier, lineitem, orders, customer, nation n1, nation n2
        where s_suppkey = l_suppkey and o_orderkey = l_orderkey and
              c_custkey = o_custkey and s_nationkey = n1.n_nationkey and
              c_nationkey = n2.n_nationkey and
              ((n1.n_name = 'FRANCE' and n2.n_name = 'GERMANY') or
               (n1.n_name = 'GERMANY' and n2.n_name = 'FRANCE') ) and
              l_shipdate between date('1995-01-01') and date('1996-12-31')) as
shipping
group by supp_nation, cust_nation, l_year
order by supp_nation, cust_nation, l_year;
```

Without using a dictionary, the above query may need to apply the predicates n1.n_name='FRANCE', n2.n_name=''GERMANY', n1.n_name='GERMANY', and n2.n_name='FRANCE'' directly to the "nation" table, then join the results of those back to the "customer" table using the predicates s_nationkey=n1.n_nationkey, and c_nationkey=n2.n_nationkey.

According to the embodiments of the present invention, the "customer" and "supplier" tables may dictionary encode their respective "nationkey" columns. For example, for the nation key column and nation name column of the "nation" table, two dictionaries c_n_nationkey and c_n_name may be created for the "customer" table; and two dictionaries s_n_nationkey and s_n_name may be created for the "supplier" table. The c_n_name and s_n_name may become virtual columns of the "customer" and "supplier" tables, respectively. Therefore, with these virtual columns, the predicates of the form c_nationkey=n_nationkey and <nation column>=<value> may be re-written to c_<nation column>=<value>.

And any direct reference(s) to the "nation" table may be removed, thus allowing direct application of the dimension predicate to the fact table.

For example, the above SQL query may be re-written as:

```
select supp_nation, cust_nation, l_year, sum(volume) as revenue
from  (select n1.n_name s_n_name as supp_nation, n2.n_name c_n_name as
cust_nation, year(l_shipdate) as l_year, l_extendedprice * (1 - l_discount) as volume
from supplier, lineitem, orders, customer, nation n1, nation n2
where s_suppkey = l_suppkey and o_orderkey = l_orderkey and
       c_custkey o_custkey and s_nationkey = n2.n_nationkey and
       c_nationkey = n2.n_nationkey and
       (( n1.n_name   s_n_name=  'FRANCE'  and  n2.n_name    c_n_name =
'GERMANY') or
       ( n1.n_name   s_n_name =  'GERMANY'   and n2.n_name c_n_name  =
'FRANCE') ) and
       l_shipdate between date('1995-01-01') and date('1996-12-31')) as shipping
group by supp_nation, cust_nation, l_year
order by supp_nation, cust_nation, l_year;
```

As shown in the re-written query, in which removed text and/or predicates are shown in strikethrough, the predicates on the "nation" dimension table column n_nation can be applied directly the fact tables, "customer" and "supplier," with the joins between these tables eliminated. Thus, the re-written query may lead to the performance benefits observed from full or partial materialization of a dimension table into a fact table, without the overhead of the redundancy. It should be noted, in some embodiments, the re-write may be performed by a rewrite engine or a database system without any input from a user (e.g., a database administrator).

In some embodiments, the database system 18 may include a change to the database definition language (DDL) to add an "as dictionary," "a compressed dictionary" or some other such options to the DDL for defining a table (e.g., DIM_A 202), to signal to the database system that the table should be considered for this optimization. Moreover, in some embodiments, the database system 18 may also include tools for identifying the parent/child or primary/foreign key relationships and/or tools for identifying candidate columns for creating dictionary. In one embodiment, a database system according to the present invention may favor the use of a symbol-based dictionary for the foreign key column over a delta coded method or other methods a database system may support for compression.

One aspect of table interactions in a database system is the need for locking and logging. In some embodiments, one or more dictionaries may be updated. For example, although the underlying table for a dictionary may be rarely updated, it may still be updated occasionally. In such embodiments, the underlying table may have the duality of being a table (e.g., DIM_A 202) and also having a set of dictionaries (e.g., DICT_A_Key 206, DICT_A_Value1 208 and DICT_A_Value2 210) associated with it. All queries that make use of such a dictionary may still need to register a read lock against the table. Because read locks are shared, it is not necessary to apply row-specific locking, which greatly reduces the overhead associated with the dictionary based table.

In one embodiment, the insert, update and delete operations may be implemented by applying appropriate table-level locks to the underlying tables when the mapped dimension table column(s) are accessed. When an update or insert is performed against the underlying table, the update or insertion may be propagated to the dictionaries (e.g., generated at block 506) after obtaining appropriate locking against the table, the affected column(s) or a proxy of the table. In such an embodiment, an underlying table may be the core "lock control" target such that any access to data derived from the underlying table (e.g., any associated dictionaries) will trigger appropriate lock (e.g., read lock) on the underlying table. In another embodiment, the dictionary may be chosen as the core "lock control" target instead of the underlying table. In this embodiment, any access to the dictionary may cause an appropriate lock being put on the dictionary itself and an appropriate lock will be placed on the underlying table only when it is necessary. For example, when the underlying table is about to be modified, the database engine may check to see if there is any outstanding lock on data derived from the underlying table and apply an appropriate lock on the underlying table if there is. Therefore, as long as there is no I/U/D operation on the underlying table, there is no lock on the underlying table for accessing the dictionary associated with the underlying table.

In some embodiments, a primary-foreign key relationship may be defined as a primary-foreign key constraint with predefined database actions. Exemplary database actions may include marking the foreign key entries as NULL when the corresponding primary key entries are deleted, or deleting the table rows having such foreign keys. In such embodiments, when a delete is performed, the deletion may be propagated to the dictionary as per the defined database action for the primary-foreign key constraint, for example, marking the dictionary entry as NULL or delete the dictionary entry depending on the primary-foreign key constraint. In some other embodiments, if no action is defined, the dictionary entry may be marked as "invalid" or "null" such that that entry can not be produced by an inner join, or such that that entry is produced as NULL if an Outer Join is used.

It will be appreciated that the embodiments described above and illustrated in the drawings represent only a few of the many ways of implementing embodiments for execution of queries using a dimension table implemented as decompression dictionaries to reduce or eliminate join operations.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software (e.g., database system 18 or database modules 40) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., database system 18 or database modules 40) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., tables, relationships, dictionaries, queries). The database system may be implemented by any number of any conventional or other databases, data stores or storage structures (e.g., files, databases, data structures, data or other repositories, etc.) to store information (e.g., e.g., tables, relationships, dictionaries, queries). The database system may be included within or coupled to the server and/or client systems. The database systems and/or storage structures may be remote from or local to the computer or other processing systems, and may store any desired data (e.g., tables, relationships, dictionaries, queries).

The present invention embodiments may employ any number of any type of user interface (e.g., Graphical User Interface (GUI), command-line, prompt, etc.) for obtaining or providing information (e.g.,), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for executing database queries, comprising:
    selecting a column of a first table as a candidate column for creating a dictionary;
    creating tokens for a foreign key in a second table that corresponds to a primary key in the first table, each of the created tokens being a respective compression symbol;
    generating the dictionary for the selected column using the created tokens as indexes in the dictionary; and
    modifying a query that accesses the column of the first table using a join between the first table and the second table by rewriting the query to eliminate the join by retrieving column values based on using the created tokens for the foreign key in the second table as the indexes into the dictionary to directly obtain from the dictionary one or more values corresponding to one or more column values in the first table.

2. The method of claim 1, wherein selecting the candidate column comprises:

receiving first information representative of a parent-child relationship in a database schema based on a primary-foreign key relationship between the first table and the second table; and determining that the selected column is most commonly accessed by a join operation between the first table and the second table.

3. The method of claim 1, wherein the compression symbols are created based on a dictionary tokenization technique.

4. The method of claim 3, wherein the dictionary tokenization technique is selected from a group including Huffman coding and arithmetic coding.

5. The method of claim 1, wherein the dictionary is a single column dictionary corresponding to one column in the first table.

6. The method of claim 1, further comprising applying a lock on the dictionary instead of the first table when the dictionary is accessed.

7. The method of claim 1, wherein the dictionary is a multi-column dictionary corresponding to multiple columns in the first table concatenated together.

\* \* \* \* \*